(12) United States Patent
Higuchi et al.

(10) Patent No.: US 7,226,367 B2
(45) Date of Patent: Jun. 5, 2007

(54) GOLF BALL

(75) Inventors: Hiroshi Higuchi, Chichibu (JP); Nobuyuki Kataoka, Chichibu (JP); Atsushi Nanba, Chichibu (JP); Hiroyuki Nagasawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 11/279,472

(22) Filed: Apr. 12, 2006

(65) Prior Publication Data

US 2006/0240911 A1    Oct. 26, 2006

Related U.S. Application Data

(63) Continuation-in-part of application No. 10/423,050, filed on Apr. 25, 2003, now Pat. No. 7,074,859, which is a continuation-in-part of application No. 10/191,799, filed on Jul. 10, 2002, now abandoned.

(30) Foreign Application Priority Data

Apr. 30, 2002 (JP) ............................. 2002-128250

(51) Int. Cl.
*A63B 37/06* (2006.01)
(52) U.S. Cl. ...................... 473/373; 525/193
(58) Field of Classification Search ............... 473/373, 473/374, 368, 367
See application file for complete search history.

(56) References Cited

U.S. PATENT DOCUMENTS

| | | | |
|---|---|---|---|
| 4,546,980 A | 10/1985 | Gendreau et al. | |
| 4,683,257 A | 7/1987 | Kakiuchi et al. | |
| 4,692,497 A | 9/1987 | Gendreau et al. | |
| 4,770,422 A | 9/1988 | Isaac | |
| 4,929,678 A | 5/1990 | Hamada et al. | |
| 4,955,613 A | 9/1990 | Gendreau et al. | |
| 5,018,740 A | 5/1991 | Sullivan | |
| 5,082,285 A | 1/1992 | Hamada et al. | |
| 5,683,773 A | 11/1997 | Kemper | |
| 5,929,171 A | 7/1999 | Sano et al. | |
| 6,113,831 A | 9/2000 | Nesbitt et al. | |
| 6,194,505 B1 | 2/2001 | Sone et al. | |
| 6,277,924 B1 | 8/2001 | Hamada et al. | |
| 6,312,346 B1 | 11/2001 | Sugimoto | |
| 6,558,276 B1 | 5/2003 | Yokota et al. | |
| 6,583,229 B2 | 6/2003 | Mano et al. | |
| 6,899,640 B2 | 5/2005 | Sasaki et al. | |
| 7,074,859 B2* | 7/2006 | Higuchi et al. | 525/193 |
| 2003/0100386 A1 | 5/2003 | Jordan | |
| 2003/0130396 A1* | 7/2003 | Voorheis et al. | 524/392 |
| 2003/0207999 A1 | 11/2003 | Higuchi et al. | |

FOREIGN PATENT DOCUMENTS

| | | |
|---|---|---|
| JP | 11-035633 | 2/1999 |
| JP | 11-319148 A | 11/1999 |

OTHER PUBLICATIONS

Mark R. Mason et al.; "Hydrolysis of Tri-*tert*-butylalumimum: The First Structual Characteristization of Alkylalumoxanes [$(R_2Al)_2O]_n$ and$(RAIO)_n$"; American Chemical Society; vol. 115; No. 12, 1993; pp. 4971-4984.

C. Jeff Harlan et al.; "Three-Coordinate Alumimum Is Not A Prerequisite for Catalytic Acitivity In The Zirconocene Alumoxane Polymerization of Ethylene"; American Chemical Society, vol. 117, No. 24; 1995; pp. 6465-6474.

Report of Research & Development; Fine Chemical; vol. 23, No. 9, 1994; pp. 5-15.

Akzo Nobel data sheet for Perkadox 14.
Akzo Nobel data sheet for Perkadox BC-FF.

* cited by examiner

*Primary Examiner*—Raeann Trimiew
(74) *Attorney, Agent, or Firm*—Sughrue Mion, PLLC

(57) ABSTRACT

A golf ball comprises a solid core consisting of a center core and an outer core, wherein at least one of cores is made of a rubber composition comprising 100 parts by weight of a base rubber including. 60 to 100% by weight of a polybutadiene containing at least 60% by weight of cis-1,4-bond, having a Mooney viscosity ($ML_{1+4}$ (100° C.)) of at least 52, and synthesized using a rare-earth catalyst, 10 to 60 parts by weight of an unsaturated carboxylic acid and/or a metal salt thereof, 5 to 80 parts by weight of an-inorganic filler, and an organic peroxide, and wherein the center core has a JIS-C hardness of 40 to 60 on its center and a JIS-C hardness of 55 to 75 on its surface and the difference therebetween is at least 10, the outer core is harder than the surface hardness of the center core, the cross-sectional hardness of 1 mm outside from the border between the center core and the outer core is from 65 to 85 on a JIS-C hardness, the surface of the outer core has a JIS-C hardness of 75 to 95.

10 Claims, No Drawings

GOLF BALL

CROSS REFERENCE TO RELATED APPLICATION

This application is a continuation-in-part of Application Ser. No. 10/423,050 filed on Apr. 25, 2003 now U.S. Pat. No. 7,074,859, which is a continuation-in-part of application Ser. No. 10/191,799 filed on Jul. 10, 2002, now abandoned: the entire contents of 10/423,050 and 10/191,799 are hereby incorporated by reference.

BACKGROUND OF THE INVENTION

This invention relates to a golf ball which is endowed with good resilience characteristics and satisfactory flight performance due to improvements in a rubber composition of which the solid core or the like is formed.

To confer golf balls with outstanding resilience characteristics, various improvements were made in the prior art in formulating the polybutadiene used as the base rubber.

U.S. Pat. No. 4,683,257 proposes a rubber composition for use in solid golf balls, comprising a polybutadiene having a Mooney viscosity of 70 to 100 and synthesized using a nickel or cobalt catalyst, in admixture with another polybutadiene having a Mooney viscosity of 30 to 90 and synthesized using a lanthanoid catalyst or polybutadiene having a Mooney viscosity of 20 to 50 and synthesized using a nickel or cobalt catalyst as the base rubber.

However, the composition of the above patent needs further improvements in resilience.

U.S. Pat. No. 4,955,613 proposes golf balls prepared using a blend of a polybutadiene having a Mooney viscosity of less than 50 and synthesized with a Group VIII catalyst in combination with a polybutadiene having a Mooney viscosity of less than 50 and synthesized with a lanthanide catalyst. However, the resulting golf balls have poor resilience characteristics.

U.S. Pat. No. 6,312,346 proposes a multi-piece solid golf ball having an intermediate layer formed of a low-Mooney viscosity polybutadiene; JP-A 11-319148 proposes a solid golf ball molded from a rubber composition comprising a polybutadiene having a Mooney viscosity of 50 to 69 and synthesized using a nickel or cobalt catalyst in combination with a polybutadiene having a Mooney viscosity of 20 to 90 and synthesized using a lanthanoid catalyst; U.S. Pat. No. 6,194,505 proposes a solid golf ball molded from a rubber composition based on a rubber having a 1,2 vinyl content of at most 2.0% and a weight-average molecular weight to number-average molecular weight ratio Mw/Mn of not more than 3.5; U.S. Pat. No. 4,929,678 proposes a golf ball molded from a rubber composition comprising a high Mooney viscosity polybutadiene; and U.S. Pat. No. 5,082,285 proposes a golf ball molded from a rubber composition comprising polybutadiene having a high number-average molecular weight in admixture with polybutadiene having a low number-average molecular weight. However, none of these proposals are regarded satisfactory in resilience characteristics.

U.S. Pat. No. 4,546,980 describes use of two organic peroxides, and U.S. Pat. No. 4,770,422 describes use of a minor amount of organic peroxide. However, there arise problems including insufficient resilience and a prolonged crosslinking time causing a substantial lowering of productivity.

SUMMARY OF THE INVENTION

An object of the invention is to provide a golf ball which is improved in productivity due to reduced vulcanization time and exhibits excellent resilience and good flight performance.

Making extensive investigations to achieve the above object, the inventor has found that in the case of a solid core consisting of a center core and an outer core, at least one of cores being made of a rubber composition, when the rubber composition is formulated by using a base rubber composed primarily of a polybutadiene containing at least 60% by weight of cis-1,4-bond, having a Mooney viscosity ($ML_{1+4}$ (100° C.)) of at least 52, and synthesized using a rare-earth catalyst, 10 to 60 parts by weight of an unsaturated carboxylic acid and/or a metal salt thereof, 5 to 80 parts by weight of an inorganic filler, and an organic peroxide, and when the center core has a JIS-C hardness of 40 to 60 on its center and a JIS-C hardness of 55 to 75 on its surface and the difference therebetween is at least 10, the outer core is harder than the surface hardness of the center core, the cross-sectional hardness of 1 mm outside from the border between the center core and the outer core is from 65 to 85 on a JIS-C hardness, the surface of the outer core has a JIS-C hardness of 75 to 95, a golf ball is improved in manufacture efficiency and resilience characteristics.

Accordingly, the present invention provides a golf ball as set forth below.

[1] A golf ball comprising a solid core consisting of a center core and an outer core, wherein at least one of cores is made of a rubber composition comprising 100 parts by weight of a base rubber including 60 to 100% by weight of a polybutadiene containing at least 60% by weight of cis-1,4-bond, having a Mooney viscosity ($ML_{1+4}$ (100° C.)) of at least 52, and synthesized using a rare-earth catalyst, 10 to 60 parts by weight of an unsaturated carboxylic acid and/or a metal salt thereof, 5 to 80 parts by weight of an inorganic filler, and an organic peroxide, and wherein the center core has a JIS-C hardness of 40 to 60 on its center and a JIS-C hardness of 55 to 75 on its surface and the difference therebetween is at least 10, the outer core is harder than the surface hardness of the center core, the cross-sectional hardness of 1 mm outside from the border between the center core and the outer core is from 65 to 85 on a JIS-C hardness, the surface of the outer core has a JIS-C hardness of 75 to 95.

[2] The golf ball of [1], wherein the polybutadiene has a polydispersity index Mw/Mn of 2.0 to 8.0 wherein Mw is a weight average molecular weight and Mn is a number average molecular weight.

[3] The golf ball of [1], wherein the polybutadiene is a modified polybutadiene rubber which has been synthesized using a neodymium catalyst and subsequently reacted with an end group modifier.

[4] The golf ball of [1], wherein said base rubber contains, in addition to said polybutadiene, a second polybutadiene synthesized using a Group VIII catalyst in an amount of up to 40% by weight, said second polybutadiene having a Mooney viscosity ($ML_{1+4}$ (100° C.)) of less than 50.

[5] The golf ball of [1], wherein an organosulfur compound is added by 0.1 to 5 parts by weight based on 100 parts by weight of the base rubber.

[6] The golf ball of [1], wherein at least two organic peroxides are included in the rubber composition and one

[7] The golf ball of [1], wherein the organic peroxide includes 1,1-bis(t-butylperoxy)-3,3,5-trimethylcyclohexane and dicumyl peroxide.

[8] The golf ball of [1], having a cover enclosing the core and the cover consists of an inner cover layer and an outer cover.

[9] The golf ball of [8], wherein the inner cover layer has a Shore D hardness of 50 to 80, the outer cover layer has a Shore D hardness of 35 to 65, and the outer cover layer has a lower Shore D hardness than the inner cover layer.

[10] The golf ball of [1], wherein the center core has a diameter of 15 to 36 mm and the outer core has a thickness of 1.5 to 10 mm, and the inner cover layer has a thickness of 0.5 to 3.0 mm and the outer cover layer has a thickness of 0.7 to 2.0 mm.

DETAILED DESCRIPTION OF THE INVENTION

The golf ball of the invention comprises a solid core consisting of a center core and an outer core, wherein at least one of cores is made of a rubber composition comprising (A) a base rubber composed primarily of a polybutadiene containing at least 60% by weight of cis-1,4-bond, having a Mooney viscosity ($ML_{1+4}$ (100° C.)) of at least 52, and synthesized using a rare-earth catalyst, (B) an unsaturated carboxylic acid and/or a metal salt thereof, (D) an inorganic filler, and (E) organic peroxides.

The polybutadiene serving as component (A) should contain at least 60% by weight, preferably at least 80% by weight, more preferably at least 90% by weight, most preferably at least 95% by weight of cis-1,4-bond. Too less a cis-1,4-bond content leads to a lowering of resilience or restitution.

The polybutadiene should have a Mooney viscosity ($ML_{1+4}$ (100° C.)) of at least 52, preferably at least 53, more preferably at least 54, most preferably 60 and the upper limit of Mooney viscosity is preferably up to 140, more preferably up to 120, even more preferably up to 100, most preferably up to 80.

The term "Mooney viscosity" used herein refers in each case to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement is carried out at a temperature of 100° C.

It is requisite for the polybutadiene used herein to be synthesized with a rare-earth catalyst. Any well-known rare-earth catalyst may be used.

Examples of suitable catalysts include lanthanoid series rare-earth compounds, organoaluminum compounds, alumoxane, and halogen-bearing compounds, optionally in combination with Lewis bases.

Examples of suitable lanthanoid series rare-earth compounds include halides, carboxylates, alcoholates, thioalcoholates and amides of atomic number 57 to 71 metals.

Organoaluminum compounds that may be used include those of the formula $AlR^1R^2R^3$ (wherein $R^1$, $R^2$ and $R^3$ are each independently hydrogen or a hydrocarbon residue of 1 to 8 carbon atoms).

Preferred alumoxanes include compounds of the structures shown in formulas (I) and (II) below. The alumoxane association complexes described in *Fine Chemical*, 23, No. 9, 5 (1994), *J. Am. Chem. Soc.*, 115, 4971 (1993), and *J. Am. Chem. Soc.*, 117, 6465 (1995) are also acceptable.

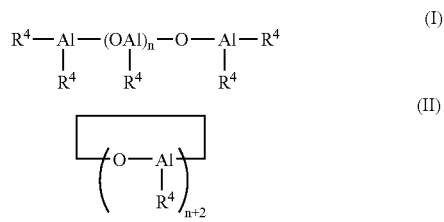

In the above formulas, $R^4$ is a hydrocarbon group having 1 to 20 carbon atoms, and n is an integer of at least 2.

Examples of halogen-bearing compounds that may be used include aluminum halides of the formula $AlX_nR_{3-n}$ (wherein X is a halogen; R is a hydrocarbon residue of 1 to 20 carbon atoms, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$; and other metal halides such as silicon tetrachloride, tin tetrachloride and titanium tetrachloride.

The Lewis base may be used to form a complex with the lanthanoid series rare-earth compound. Illustrative examples include acetylacetone and ketone alcohols.

In the practice of the invention, the use of a neodymium catalyst comprising a neodymium compound as the lanthanoid series rare-earth compound is advantageous because a polybutadiene rubber having a high cis-1,4 content and a low 1,2-vinyl content can be obtained at an excellent polymerization activity. Preferred examples of such rare-earth catalysts include those mentioned in JP-A 11-35633.

For polymerization of butadiene in the presence of a rare-earth catalyst in the form of a lanthanoid series rare-earth compound, in order that the cis content and the Mw/Mn fall in the above-mentioned ranges, the molar ratio of butadiene to lanthanoid series rare-earth compound is preferably from 1,000/1 to 2,000,000/1, especially from 5,000/1 to 1,000,000/1, and the molar ratio of $AlR^1R^2R^3$ to lanthanoid series rare-earth compound is preferably from 1/1 to 1,000/1, especially from 3/1 to 500/1. Further, the molar ratio of halogen compound to lanthanoid series rare-earth compound is preferably from 0.1/1 to 30/1, especially from 0.2/1 to 15/1. The molar ratio of Lewis base to lanthanoid series rare-earth compound is preferably from 0 to 30/1, especially from 1/1 to 10/1.

The polymerization of butadiene in the presence of a rare-earth catalyst may be carried out either with or without the use of solvent, as by bulk polymerization or vapor phase polymerization. The polymerization temperature is generally in a range of −30° C. to 150° C., and preferably 10° C. to 100° C.

It is also possible for the polybutadiene as component (A) to be obtained by polymerization with the above-described rare-earth catalyst, followed by the reaction of an end group modifier with active end groups on the polymer.

Modified polybutadiene rubbers can be prepared by using end group modifiers (1) to (7) listed below, following the above polymerization.

(1) Compounds having an alkoxysilyl group to be reacted with the polymer at active ends thereof. Suitable compounds having an alkoxysilyl group are alkoxysilane compounds having at least one epoxy or isocyanate group in a molecule, for example, epoxy group-containing alkoxysilanes such as 3-glycidyloxypropyltrimethoxysilane, 3-glycidyloxypropyltriethoxysilane, (3-glycidyloxypropyl)methyldimethoxysilane, (3-glycidyloxypropyl)methyldiethoxysilane, β-(3,4-epoxycyclohexyl) trimethoxysilane, β-(3,4-epoxycyclohexyl) triethoxysilane, β-(3,4-epoxycyclohexyl) methyldimethoxysilane, β-(3,4-epoxycyclohexyl) ethyldimethoxysilane, condensates of 3-glycidyloxypropyltrimethoxysilane, and condensates of (3-glycidyloxypropyl)methyldimethoxysilane; and isocyanato group-containing alkoxysilanes such as 3-isocyanatopropyltrimethoxysilane, 3-isocyanatopropyltriethoxysilane, (3-isocyanatopropyl) methyldimethoxysilane, (3-isocyanatopropyl) methyldiethoxysilane, condensates of 3-isocyanatopropyltrimethoxysilane, and condensates of (3-isocyanatopropyl)methyldimethoxysilane.

When a compound having an alkoxysilyl group is reacted to active ends of the polymer, a Lewis acid may be added for promoting the reaction. The Lewis acid added serves as a catalyst to promote coupling reaction for improving the cold flow and storage stability of the modified polymer. Examples of the Lewis acid include dialkyltin dialkylmaleates, dialkyltin dicarboxylates, and aluminum trialkoxides.

(2) Halogenated organometallic compounds, halogenated metallic compounds and organometallic compounds of the general formulas: $R^5_n M'X_{4-n}$, $M'X_4$, $M'X_3$, $R^5_n M'(-R^6-COOR^7)_{4-n}$ or $R^5_n M'(-R^6-COR^7)_4$, (wherein $R^5$ and $R^6$ are each independently a hydrocarbon group of 1 to 20 carbon atoms; $R^7$ is a hydrocarbon group of 1 to 20 carbon atoms which may contain a carbonyl or ester moiety on a side chain; M' is a tin atom, silicon atom, germanium atom or phosphorus atom; X is a halogen atom; and n is an integer from 0 to 3).

(3) Heterocumulene compounds containing on the molecule a Y=C=Z linkage (wherein Y is a carbon atom, oxygen atom, nitrogen atom or sulfur atom; and Z is an oxygen atom, nitrogen atom or sulfur atom).

(4) Three-membered heterocyclic compounds containing on the molecule the following linkage:

(wherein Y is an oxygen atom, nitrogen atom or sulfur atom).

(5) Halogenated isocyano compounds.

(6) Carboxylic acids, acid halides, ester compounds, carbonate compounds or acid anhydrides of the formulas: $R^8$—$(COOH)_m$, $R^9(COX)_m$, $R^{10}$—$(COO$—$R^{11})_m$, $R^{12}$—$OCOO$—$R^{13}$, $R^{14}$—$(COOCO$—$R^{15})_m$ or the following formula:

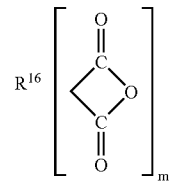

(wherein $R^8$ to $R^{16}$ are each independently a hydrocarbon group of 1 to 50 carbon atoms; X is a halogen atom; and m is an integer from 1 to 5); and (7) Carboxylic acid metal salts of the formula: $R^{17}_l M''$ $(OCOR^{18})_{4-l}$, $R^{19}_l M''(OCO$—$R^{20}$—$COOR^{21})_{4-l}$ or the following formula:

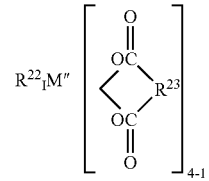

(wherein $R^{17}$ to $R^{23}$ are each independently a hydrocarbon group of 1 to 20 carbon atoms, M'' is a tin atom, silicon atom or germanium atom; and l is an integer from 0 to 3).

Illustrative examples of the end group modifiers of types (1) to (7) above and methods for their reaction are described in, for instance, JP-A 11-35633, JP-A 7-268132 and JP-A 2002-293996.

In the practice of the invention, the above-mentioned polybutadiene should preferably have a polydispersity index Mw/Mn (wherein Mw is a weight average molecular weight and Mn is a number average molecular weight) of at least 2.0, more preferably at least 2.2, even more preferably at least 2.4, most preferably at least 2.6, but up to 8.0, more preferably up to 7.5, even more preferably up to 4.0, most preferably up to 3.4. Too low Mw/Mn may lead to low working efficiency whereas too high Mw/Mn may lead to low resilience.

The invention uses a base rubber composed primarily of the above-mentioned polybutadiene. Specifically, the polybutadiene may be included in an amount of at least 60% by weight, preferably at least 70% by weight, more preferably at least 80% by weight, most preferably at least 85% by weight, based on the base rubber. It is acceptable that 100% by weight of the base rubber is the above-mentioned polybutadiene while the polybutadiene content may be up to 95% by weight, and in some cases, up to 90% by weight.

Suitable rubber components other than the above-mentioned polybutadiene include polybutadienes other than the above-mentioned polybutadiene, such as polybutadiene synthesized with a Group VIII metal compound catalyst and polybutadiene synthesized using a rare-earth catalyst, and other diene rubbers, such as styrene-butadiene rubber, natural rubber, isoprene rubber, and ethylene-propylene-diene rubber.

Of the rubber components other than the above-mentioned polybutadiene, a second polybutadiene synthesized with a Group VIII catalyst and having a Mooney viscosity ($ML_{1+4}$ (100° C.)) of less than 50 and a viscosity q of 200 mPa·s to 400 mPa·s at 25° C. in a 5 wt % toluene solution thereof is advantageously used because high resilience and efficient working are accomplished.

Illustrative of the Group VIII catalyst are nickel and cobalt catalysts described below.

Examples of suitable nickel catalysts include single-component systems such as nickel-kieseluhr, binary systems such as Raney nickel/titanium tetrachloride, and ternary systems such as nickel compound/organometallic compound/boron trifluoride etherate. Exemplary nickel compounds include reduced nickel on a carrier, Raney nickel, nickel oxide, nickel carboxylate and organonickel complexes. Exemplary organometallic compounds include trialkylaluminum compounds such as triethylaluminum, tri-n-propylaluminum, truisobutylaluminum and tri-n-hexylaluminum; alkyllithium compounds such as n-butyllithium, sec-butyllithium, tert-utyllithium and 1,4-dilithiumbutane; and dialkylzinc compounds such as diethylzinc and dibutylzinc.

Examples of suitable cobalt catalysts include cobalt and cobalt compounds such as Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithiocarbamate, cobalt anilinium nitrite and cobalt dinitrosyl chloride. It is particularly advantageous to use the above in combination with a dialkylaluminum monochloride such as diethylaluminum monochloride or diisobutylaluminum monochloride; a trialkylaluminum such as triethylaluminum, tri-n-propylaluminum, triisobutylaluminum or tri-n-hexylaluminum; an alkyl aluminum sesquichloride such as ethylaluminum sesquichloride; or aluminum chloride.

Polymerization using the Group VIII catalysts described above, and especially a nickel or cobalt catalyst, can generally be carried out by a process in which the catalyst is continuously charged into the reactor together with the solvent and butadiene monomer, and the reaction conditions are suitably selected from a temperature range of 5 to 60° C. and a pressure range of atmospheric pressure to 70 plus atmospheres, so as to yield a product having the above-indicated Mooney viscosity.

The second polybutadiene should have a Mooney viscosity of less than 50, preferably up to 48, more preferably up to 45. The lower limit of Mooney viscosity is preferably at least 10, more preferably at least 20, even more preferably at least 25, most preferably at least 30.

The second polybutadiene should preferably have a viscosity $\eta$ of at least 200 mPa·s, more preferably at least 210 mPa·s, even more preferably at least 230 mPa·s, most preferably at least 250 mPa·s, and up to 400 mPa·s, more preferably up to 370 mPa·s, even more preferably up to 340 mPa·s, most preferably up to 300 mPa·s, as measured in a 5 wt % toluene solution thereof at 25° C.

The "viscosity $\eta$ at 25° C. in a 5 wt % toluene solution" refers herein to the value in mPa-s units obtained by dissolving 2.28 g of the polybutadiene to be measured in 50 ml of toluene and carrying out measurement with a specified viscometer at 25° C. using a standard solution for the viscometer (JIS Z8809).

The second polybutadiene may be included in the base rubber in an amount of at least 0% by weight, preferably at least 5% by weight, more preferably at least 10% by weight, and preferably up to 40% by weight, more preferably up to 30% by weight, even more preferably up to 20% by weight, most preferably up to 15% by weight.

Suitable unsaturated carboxylic acids serving as component (B) include acrylic acid, methacrylic acid, maleic acid and fumaric acid. Acrylic acid and methacrylic acid are especially preferred. Suitable unsaturated carboxylic acid metal salts include the zinc and magnesium salts of unsaturated fatty acids. Zinc acrylate is especially preferred.

The unsaturated carboxylic acid and/or salt thereof serving as component (B) is preferably included in an amount, per 100 parts by weight of the base rubber as component (A), of at least 10 parts by weight, more preferably at least 15 parts by weight, even more preferably at least 20 parts by weight, but not more than 60 parts by weight, more preferably not more than 50 parts by weight, even more preferably not more than 45 parts by weight, and most preferably not more than 40 parts by weight.

Optionally, the organosulfur compound component (C) may be added, if necessary. The organosulfur compound serving as component (C) includes, for example, thiophenols, thionaphthols, halogenated thiophenols, and metal salts thereof. Specific examples include pentachlorothiophenol, pentafluorothiophenol, pentabromothiophenol, p-chlorothiophenol, and zinc salts thereof; and organosulfur compounds having 2 to 4 sulfur atoms, such as diphenyl polysulfides, dibenzyl polysulfides, dibenzoyl polysulfides, dibenzothiazoyl polysulfides, dithiobenzoyl polysulfides, alkylphenyl disulfides, sulfur compounds having a furan ring, and sulfur compounds having a thiophene ring. The zinc salt of pentachlorothiophenol and diphenyl disulfide are especially preferred.

The organosulfur compound may be included in an amount, per 100 parts by weight of the base rubber (A), of at least 0.1 part, more preferably at least 0.2 part, even more preferably at least 0.4 part, and most preferably at least 0.7 part by weight, but not more than 5 parts, preferably not more than 4 parts, more preferably not more than 3 parts, even more preferably not more than 2 parts, and most preferably not more than 1.5 parts by weight. Too less an amount of the organosulfur compound is ineffective for improving resilience whereas too much an amount gives too low a hardness and fails to provide sufficient resilience.

Exemplary inorganic fillers serving as component (D) include zinc oxide, barium sulfate and calcium carbonate. The inorganic filler is included in an amount, per 100 parts by weight of component (A), of at least 5 parts, preferably at least 7 parts, more preferably at least 10 parts, and most preferably at least 13 parts by weight, but not more than 80 parts, more preferably not more than 65 parts, even more preferably not more than 50 parts, and most preferably not more than 40 parts by weight. Too much or too less an amount of the filler fails to achieve an optimum weight and appropriate resilience.

In the present invention, an organic peroxides (E) is included. Preferably, two or more organic peroxides may be used as component (E). Provided that an organic peroxide having the shortest half-life at 155° C. is designated (a), another organic peroxide (b) having the longest half-life at 155° C. is designated (b), the half-life of (a) is designated $a_t$, and the half-life of (b) is designated $b_t$, the ratio of half-lives $(b_t/a_t)$ is preferably at least 7, more preferably at least 8, further more preferably at least 9, even most preferably at least 10, and preferably up to 20, more preferably up to 18, even more preferably up to 16. Even when two or more organic peroxides are used, a half-life ratio outside the range may lead to poor resilience, compression and durability.

Herein, the half-life ($a_t$) at 155° C. of the peroxide (a) is preferably at least 5 seconds, more preferably at least 10 seconds, even more preferably at least 15 seconds, and up to 120 seconds, more preferably up to 90 seconds, even more preferably up to 60 seconds. The half-life ($b_t$) at 155° C. of the peroxide (b) is preferably at least 300 seconds, more preferably at least 360 seconds, even more preferably at least 420 seconds, and preferably up to 800 seconds, more preferably up to 700 seconds, even more preferably up to 600 seconds.

Illustrative examples of the organic peroxides include dicumyl peroxide, 1,1-bis(t-butylperoxy)-3,3,5-trimethylcyclohexane, and α,α'-bis(t-butylperoxy)diisopropylbenzene. The organic peroxides used may be commercial products, suitable examples of which include Percumyl D (manufactured by NOF Corporation), Perhexa 3M (manufactured by NOF Corporation) and Luperco 231XL (manufactured by Atochem Co.). The preferred organic peroxide (a) is 1,1-bis(t-butylperoxy)-3,3,5-trimethylcyclohexane, and the preferred organic peroxide (b) is dicumyl peroxide.

The total content of the organic peroxides including (a) and (b) is at least 0.1 part, preferably at least 0.2 part, more preferably at least 0.3 part, even more preferably at least 0.4 part by weight and up to 2.0 parts, preferably up to 1.5 parts, more preferably up to 1.0 part, even more preferably up to 0.6 part by weight, per 100 parts by weight of component (A). Too low an organic peroxide content leads to an extended time required for crosslinking, a substantial lowering of productivity, and a substantial lowering of compression. With too high a content, resilience and durability decline.

The amount of peroxide (a) added per 100 parts by weight of component (A) is preferably at least 0.05 part, more preferably at least 0.08 part, even more preferably at least 0.1 part by weight, but preferably up to 0.5 part, more preferably up to 0.4 part, even more preferably up to 0.3 part by weight. The amount of peroxide (b) added per 100 parts by weight of component (A) is preferably at least 0.05 part, more preferably at least 0.15 part, even more preferably at least 0.2 part by weight, but preferably up to 2.0 parts, more preferably up to 1.0 part, even more preferably up to 0.6 part by weight.

If necessary, an antioxidant may be included in an amount of at least 0.05 part, more preferably at least 0.1 part, even more preferably at least 0.2 part by weight, but not more than 3 parts, more preferably not more than 2 parts, even more preferably not more than 1 part, and most preferably not more than 0.5 part by weight, per 100 parts by weight of component (A). The antioxidants used may be commercial products, for example, Nocrack NS-6 and NS-30 (Ouchi Shinko Chemical Industry Co., Ltd.), and Yoshinox 425 (Yoshitomi Pharmaceutical Industries, Ltd.).

At least one of the solid cores in the invention can be produced by vulcanizing and curing the above-described rubber composition using a method like that employed with known rubber compositions for golf balls. For example, vulcanization may be carried out at a temperature of 100 to 200° C. for a period of 10 to 40 minutes. It is noted that the rubber compositions of the center and the outer cores may be same or different from each other.

The solid core consists of a center core and an outer core around the center core. That construction of the solid core realize the reduction of the spin rate when hitting, thereby to increase the flight distance of the golf balls substantially.

It is recommended that the center core is formed to a diameter of at least 15 mm, preferably at least 20 mm, more preferably at least 22 mm, most preferably at least 24, but not more than 36 mm, preferably not more than 33 mm, more preferably not more than 30 mm, most preferably not more than 28 mm.

It is also recommended that the center hardness of the center core on a JIS-C hardness is at least 40, preferably at least 42, more preferably at least 44, most preferably at least 46, but not more than 60, preferably not more than 58, more preferably not more than 56, most preferably not more than 54. It is further recommended that the surface hardness of the center core on a JIS-C hardness is at least 55, preferably at least 57, more preferably at least 59, most preferably at least 61, but not more than 75, preferably not more than 73, more preferably not more than 71, most preferably not more than 69.

In the center core, the difference between the center hardness and the surface on a JIS-C is at least 10. It is recommended that the difference of the hardness on JIS-C scale therebetween is at least 12, preferably at least 13, more preferably at least 15, but not more than 25, preferably not more than 23, more preferably not more than 20.

It is recommended that the outer core has a thickness of at least 1.5 mm, preferably at least 2 mm, more preferably at least 2.5 mm, most preferably 3 mm, but not more than 10 mm, preferably not more than 9 mm, more preferably not more than 8 mm, most preferably not more than 7 mm.

The outer core is harder than the surface hardness of the center core. In particular, it is recommended that the difference between the hardness of the outer core and the surface hardness of the center core is at least 2, preferably at least 3, more preferably at least 4, but not more than 30, preferably not more than 20, more preferably not more than 15. It is recommended that the surface hardness of the outer core on a JIS-C hardness is at least 75, preferably at least 77, more preferably at least 79, most preferably at least 81, but not more than 95, preferably not more than 93, more preferably not more than 91, most preferably not more than 89.

The cross-sectional hardness of 1 mm outside from the border between the center core and the outer core on a JIS-C scale is at least 65, preferably at least 68, more preferably at least 71, most preferably at least 74, but not more than 85, preferably not more than 83, more preferably not more than 80, most preferably not more than 77.

In the present invention, the center core and the outer core are formed by an injection molding process and a compression molding process, respectively. It is preferred that the non-vulcanized rubber composition for an outer core is filled into the cavity of the mold used for a preparation of hemispherical cups and is subjected to semi-vulcanization at 100 to 160° C. for 1 to 10 minutes to form a pair of hemispherical cups in the state of semi-vulcanization. Then the pair of cups are fitted each other and the pair of cups cover the center core to prepare a solid core consisting of the center core and the outer core by a press molding process into a cavity of the mold at 100 to 200° C. for 5 to 20 minutes.

The golf ball of the invention may take any of various golf ball constructions to be described later. It is recommended that the solid core generally have a deflection under an applied load of 980 N (100 kg) of at least 2.0 mm, preferably at least 2.5 mm, more preferably at least 2.8 mm, most preferably at least 3.2 mm, but up to 6.0 mm, preferably up to 5.5 mm, more preferably up to 5.0 mm, most preferably up to 4.5 mm. Too small a deformation may lead to a poor feel and in particular, too much spin on long shots with a driver or similar club designed to induce large deformation to the ball, failing to travel a distance. If too soft, probable results are a dull feel, insufficient resilience, a failure to travel a distance, and poor crack durability upon repetitive impacts.

As long as the golf ball of the invention includes the solid core consisting of a center core and an outer core, the construction of the ball is not critical. Examples of suitable golf ball constructions include the golf balls consisting of a center core and an outer core, and a multi-piece solid golf balls in which a cover composed of one or more layers is formed on the solid core, and thread-wound golf balls having a solid core. From the standpoints of taking advantage of the characteristics of the solid core, enabling extrusion during manufacture, and imparting resilience characteristics to golf ball products, the two-piece golf balls and multi-piece solid golf balls are recommended as the preferred construction.

It is recommended that the solid core have a diameter of at least 30.0 mm, preferably at least 32.0 mm, more preferably at least 35.0 mm, and most preferably at least 37.0 mm, but not more than 41.0 mm, preferably not more than 40.5 mm, even more preferably not more than 40.0 mm, and most preferably not more than 39.5 mm. In particular, it is desirable for such a solid core in a two-piece solid golf ball to have a diameter of at least 37.0 mm, preferably at least 37.5 mm, even more preferably at least 38.0 mm, and most preferably at least 38.5 mm, but not more than 41.0 mm, preferably not more than 40.5 mm, and most preferably not more than 40.0 mm. Similarly, it is desirable for such a solid core in a three-piece solid golf ball to have a diameter of at least 30.0 mm, preferably at least 32.0 mm, more preferably at least 34.0 mm, and most preferably at least 35.0 mm, but not more than 40.0 mm, preferably not more than 39.5 mm, and most preferably not more than 39.0 mm.

It is also recommended that the solid core have a specific gravity of at least 0.9, preferably at least 1.0, and most preferably at least 1.1, but not more than 1.4, preferably not more than 1.3, and most preferably not more than 1.2.

In the present invention, a cover may enclose the core. In this case, it can be manufactured by using the molded/vulcanized product as the solid core, and injection molding or compression molding known cover materials therearound.

The cover materials may be mainly composed of, for example, a thermoplastic or thermosetting polyurethane elastomer, polyester elastomer, ionomer resin, polyolefin elastomer or mixture thereof. Any one or mixture of two or more thereof may be used, although the use of a thermoplastic polyurethane elastomer or ionomer resin is especially preferred.

Illustrative examples of thermoplastic polyurethane elastomers that may be used include commercial products in which the diisocyanate is an aliphatic or aromatic compound, such as Pandex T7298, T7295, T7890, TR3080, T8295 and T8290 (manufactured by DIC Bayer Polymer Ltd.). Illustrative examples of suitable commercial ionomer resins include Surlyn 6320, 8120, 8945 and 9945 (manufactured by E.I. du Pont de Nemours and Co., Inc.), and Himilan 1706, 1605, 1855, 1601 and 1557 (manufactured by DuPont-Mitsui Polychemicals Co., Ltd.).

Together with the main ingredient described above, the cover material may include also, as an optional ingredient, polymers (e.g., thermoplastic elastomers) other than the foregoing. Specific examples of polymers that may be included as optional ingredients include polyamide elastomers, styrene block elastomers, hydrogenated polybutadienes and ethylene-vinyl acetate (EVA) copolymers. Illustrative examples of suitable commercial polymer includes Dynaron (manufactured by JSR Corporation), which is an E-EB-E block copolymer.

Multi-piece solid golf balls according to the invention can be manufactured by a known method. For the manufacture of the multi-piece solid golf balls, use is advantageously made of, but not limited thereto, a well-known method involving the steps of placing the above-described molded/vulcanized product as the solid core within a predetermined injection mold, and injecting the above-described cover material over the core in a predetermined way, or successively injecting the above-described intermediate layer material and cover material in a predetermined way in the case of a multi-piece solid golf ball. In some cases, the golf ball may be produced by molding the cover material under an applied pressure.

Although the cover can include one layer or more than two layers, the cover may consist of an inner cover layer and an outer cover. In this case, it is recommended that the inner cover layer have a Shore D hardness of at least 50, preferably at least 51, more preferably 52 and most preferably at least 53, but not more than 80, preferably not more than 75, more preferably not more than 70 and most preferably not more than 65.

It is recommended that the outer cover layer have a Shore D hardness of at least 35, preferably at least 40, more preferably at least 45, and most preferably at least 48, but not more than 65, preferably not more than 58, preferably not more than 56, and most preferably not more than 54.

As noted above, in the practice of the invention the outer cover layer must have a lower Shore D hardness than the inner cover layer. It is advantageous for the inner and outer cover layers to have a difference in Shore D hardness of at least 2, preferably at least 5, more preferably at least 7, and most preferably at least 9 Shore D hardness units, but not more than 30, preferably not more than 25, and most preferably not more than 20 Shore D hardness units.

It is recommended that the inner and outer cover layers have a respective thickness of at least 0.2 mm, preferably at least 0.5 mm, more preferably at least 0.7 mm, most preferably at least 1.0 mm. It is recommended that the inner cover layer has a thickness of not more than 3.0 mm, preferably not more than 2.5 mm, more preferably not more than 2.0 mm, most preferably not more than 1.5 mm. It is also recommended that the outer cover layer has a thickness of not more than 2.0 mm, preferably not more than 1.8 mm, more preferably not more than 1.5 mm, most preferably not more than 1.2 mm.

The golf ball of the invention can be manufactured for competitive use so as to meet the Rules of Golf, that is, to a diameter of at least 42.67 mm and a weight of not more than 45.93 g. It is recommended that the upper limit of diameter be no more than 44.0 mm, preferably no more than 43.5 mm, and most preferably no more than 43.0 mm; and that the lower limit of weight be at least 44.5 g, preferably at least 45.0 g, more preferably at least 45.1 g, and most preferably at least 45.2 g.

The golf balls of the invention have excellent resilience characteristics. And, the golf balls of the present invention have a good feel upon impact or putter and an excellent spin performance.

EXAMPLE

Examples and comparative examples are given below to illustrate the invention, and are not intended to limit the scope thereof.

Examples 1–4 & Comparative Examples 1–4

The center core materials and the outer core materials shown in Table 2 were formulated in the indicated amounts per 100 parts by weight of polybutadiene material composed of polybutadiene types (1) to (4) below in the proportions shown in Table 1. The resulting center core formulations were blended in a kneader or on a roll mill and then were compression molded at 160° C. for 15 minutes to form the center core. The resulting outer core formulations were blended and then were compression molded at 130° C. for 3 minutes to form the outer core in form of the pair of cups. The resulting pairs are successively placed over the center core and compression molded one again at 170° C. for 10 minutes to obtain the solid core having two layers consisting of the center core and the outer core. It is noted that Comparative Example 2 is a single core.

Types of Polybutadiene:
(1) BR01, made by JSR Corporation
(2) BR51, made by JSR Corporation
(3) BR730, made by JSR Corporation
(4) CB22, made by Bayer AG

TABLE 1

| Type | Catalyst | cis-1,4 content, % | Mooney viscosity | Mw/Mn |
|---|---|---|---|---|
| (1) | Ni | 96 | 44 | 4.2 |
| (2) | Nd | 96 | 43 | 2.8 |
| (3) | Nd | 96 | 55 | 3 |
| (4) | Nd | 98 | 62 | 7.1 |

In each example, the resulting solid core was placed in a given mold and the appropriate resin shown in Table 3 was injection-molded over the core, thereby producing an inner layer-covered core. The covered core was then transferred to a given mold, and the appropriate resin shown in Table 3 was injection molded over the covered core, yielding a solid golf ball having a diameter of 42.67 to 42.75 mm and a weight of 45.3 to 45.8 g.

TABLE 3

| | | A | B | C | D | E |
|---|---|---|---|---|---|---|
| Formulation (pbw) | Himilan 1706 | 50 | | | | |
| | Himilan 1605 | 50 | | | | |
| | Himilan 1557 | | | | | 20 |
| | Himilan 1855 | | | | | 30 |
| | Surlyn 8945 | | 35 | | | |
| | Surlyn 9945 | | 35 | | | |
| | Surlyn 8120 | | | | | 50 |
| | Dynaron 6100P | | 30 | | | |
| | Pandex T8290 | | | 50 | | |
| | Pandex T8295 | | | 50 | 100 | |
| | Titanium dioxide | 4 | 4 | 2.7 | 2.7 | 4 |

Trade names of the above Table 3 are described below.
Himilan: An ionomer resin produced by DuPont-Mitsui Polychemicals Co., Ltd.
Surlyn: An ionomer resin produced by E.I. du Pont de Nemours and Co.
Dynaron: An E-EB-E block copolymer produced by JSR Corporation
Pandex: A thermoplastic polyurethane elastomer produced by Bayer-DIC Polymer, Ltd.

TABLE 2

| | | Example | | | | Comparative Example | | | |
|---|---|---|---|---|---|---|---|---|---|
| | | 1 | 2 | 3 | 4 | 1 | 2 | 3 | 4 |
| Center Core | | | | | | | | | |
| Center Core formulation (pbw) | Polybutadiene (1) | | | | | 100 | | | |
| | Polybutadiene (2) | | | | 20 | | | | |
| | Polybutadiene (3) | | 100 | | 100 | | | | |
| | Polybutadiene (4) | 100 | | 80 | | | 100 | 100 | 100 |
| | Dicumyl peroxide | | | 0.3 | 0.3 | 0.7 | 0.7 | 0.3 | 0.3 |
| | 1,1-bis(t-butylperoxy)-3,3,5-trimethylcyclohexane | 1.2 | 1.2 | 0.12 | 0.12 | 0.3 | | 0.12 | 0.12 |
| | Zinc oxide | 18 | 16.5 | 20 | 19.5 | 18 | 14.5 | 17 | 15.5 |
| | Antioxidant | 0.1 | 0.1 | 0.1 | 0.1 | 0.1 | 0.1 | 0.1 | 0.1 |
| | Zinc acrylate | 25 | 25 | 20 | 28 | 26 | 34 | 29 | 33 |
| | Zinc salt of pentachlorothiophenol | 1 | 1 | 1 | 1 | 1 | 1 | 0 | 0 |
| Outer Core | | | | | | | | | |
| Outer Core formulation (pbw) | Polybutadiene (1) | | | | | 100 | none | | |
| | Polybutadiene (2) | | | | 20 | | | | |
| | Polybutadiene (3) | | 100 | | 100 | | | | |
| | Polybutadiene (4) | 100 | | 80 | | | | 100 | 100 |
| | Dicumyl peroxide | 0.3 | 0.3 | 0 | 0.3 | 0.7 | | 0.3 | 0.3 |
| | 1,1-bis(t-butylperoxy)-3,3,5-trimethylcyclohexane | 0.12 | 0.12 | 1.2 | 0.12 | 0.3 | | 0.12 | 0.12 |
| | Zinc oxide | 14.5 | 11.5 | 12.5 | 16 | 14.5 | | 14.5 | 12 |
| | Antioxidant | 0.1 | 0.1 | 0.1 | 0.1 | 0.1 | | 0.1 | 0.1 |
| | Zinc acrylate | 34 | 36 | 38 | 36 | 34 | | 34 | 41 |
| | Zinc salt of pentachlorothiophenol | 1 | 1 | 1 | 1 | 1 | | 1 | 0 |

Note:
Antioxidant: Trade name; "Nocrack NS-6", which is 2,2'-methylenebis(4-methyl-6-t-butylphenol), made by Ouchi Shinko Chemical Industry Co., Ltd.

TABLE 4

|  |  |  | Example | | | | Comparative Example | | | |
| --- | --- | --- | --- | --- | --- | --- | --- | --- | --- | --- |
|  |  |  | 1 | 2 | 3 | 4 | 1 | 2 | 3 | 4 |
| Solid Core | Center Core | Outer diameter (mm) | 28.9 | 28.9 | 25.3 | 25.3 | 28.9 | 36.3 | 28.9 | 28.9 |
|  |  | Weight (g) | 14.5 | 14.4 | 9.8 | 9.9 | 14.5 | 28.8 | 14.5 | 14.5 |
|  |  | Specific gravity | 1.15 | 1.14 | 1.15 | 1.17 | 1.15 | 1.15 | 1.15 | 1.15 |
|  |  | Center hardness JIS-C scale | 48.0 | 48.0 | 42.0 | 55.0 | 50.0 | 63.0 | 60.0 | 63.0 |
|  |  | Surface hardness *1 JIS-C scale | 65.0 | 65.0 | 56.0 | 70.0 | 67.0 | 82.0 | 75.0 | 82.0 |
|  |  | Cross-Sectional hardness difference JIS-C scale | 17.0 | 17.0 | 14.0 | 15.0 | 17.0 | 19.0 | 15.0 | 19.0 |
|  | Outer core | Thickness (mm) | 3.7 | 4.7 | 5.5 | 7.0 | 3.7 |  | 3.7 | 3.7 |
|  |  | Portion of 1 mm outside from the border the center core and the outer core *2 | 72.0 | 75.0 | 75.0 | 76.0 | 72.0 |  | 72.0 | 85.0 |
|  |  | Surface hardness JIS-C scale | 82.0 | 85.0 | 88.0 | 86.0 | 82.0 |  | 82.0 | 95.0 |
|  |  | The hardness difference *2 - *1 JIS-C scale | 7.0 | 10.0 | 19.0 | 6.0 | 5.0 |  | -3.0 | 3.0 |
|  |  | Specific gravity | 1.15 | 1.14 | 1.15 | 1.17 | 1.15 |  | 1.15 | 1.15 |
|  |  | Rebound (m/s) | +0.6 | +0.7 | +0.5 | +0.7 | 0 | -0.2 | -0.8 | 0 |
| Inner cover layer | Type |  | A | A | B |  | A | A | A | A |
|  | Shore D hardness |  | 63 | 63 | 56 |  | 63 | 63 | 63 | 63 |
|  | Specific gravity |  | 0.98 | 0.98 | 0.97 |  | 0.98 | 0.98 | 0.98 | 0.98 |
|  | Thickness (mm) |  | 1.7 | 1.2 | 1.7 |  | 1.7 | 1.7 | 1.7 | 1.7 |
| Outer cover layer | Type |  | C | C | D | A | C | C | C | C |
|  | Shore D hardness |  | 47 | 47 | 51 | 63 | 47 | 47 | 47 | 47 |
|  | Specific gravity |  | 1.18 | 1.18 | 1.18 | 0.98 | 1.18 | 1.18 | 1.18 | 1.18 |
|  | Thickness (mm) |  | 1.5 | 1.0 | 1.5 | 1.7 | 1.5 | 1.5 | 1.5 | 1.5 |
| Golf ball properties | #W1 HS 50 m/s | Carry (m) | 230.0 | 231.5 | 229.5 | 232.0 | 223.0 | 221.0 | 217.5 | 223.5 |
|  |  | Total distance (m) | 261.5 | 263.5 | 262.5 | 264.5 | 254.0 | 252.0 | 248.5 | 253.0 |
|  |  | Spin rate (rpm) | 2990 | 2960 | 2920 | 2690 | 2995 | 3110 | 3100 | 3270 |
|  |  | Feel on impact | good | good | good | good | good | Slightly hard | Slightly hard | too hard |
|  | Spin rate on approach shot (sand wedge; HS 20 m/s) |  | 6285 | 6255 | 6180 | 4350 | 6310 | 6320 | 6260 | 6355 |
|  | Feel of ball when hit with putter |  | good | good | good | Slightly hard | good | good | good | Slightly hard |

The properties of the solid core and the resulting golf balls in the above Table 4 were determined as described below.

Core Surface Hardness and Center Hardness:

Both hardnesses were measured as JIS-C hardnesses The surface hardness was the average of the values measured at two randomly selected points on the core surface.

The center hardness was the average of the values obtained by cutting the core in half and measuring the hardness at the center of the cut faces on the two resulting hemispheres.

Rebound:

The initial velocity of the solid cores consisting the center cores and the outer cores was measured with the same type of initial velocity instrument as used by the official regulating body—the United States Golf Association (USGA). Each rebound value shown in Table 4 is the difference between the initial velocity of the solid core obtained in that particular example and the initial velocity of the solid core obtained in Comparative Example 1.

Material Properties:

The Shore D hardnesses of the inner cover layer and the outer cover layer were measured with a durometer by the test method described in ASTM D2240.

Flight Performance:

The total distance traveled by the ball when hit at a head speed (HS) of 50 m/s with a driver (Tour Stage X-DRIVE TYPE 350 PROSPEC, manufactured by Bridgestone Sports Co., Ltd.; loft angle, 8°) mounted on a swing robot (Miyamae Co., Ltd.) was measured. The spin rate was measured from high-speed camera images of the ball taken immediately after impact.

Spin Rate on Approach Shots:

The spin rate of a ball hit at a head speed of 20 m/s with a sand wedge (abbreviated below as "SW"; Tour Stage X-wedge, manufactured by Bridgestone Sports Co., Ltd.; loft angle, 58°) was measured. The spin rate was measured by the same method as that used above when measuring distance.

Feel:

The feel of the ball when actually shot with a driver (No. 1 Wood) and putter was rated by five professional and five top-caliber amateur golfers as "Too hard," "Slightly hard," "Good" or "Slightly soft," "Too soft." The rating assigned most often to a particular ball was used as that ball's overall rating.

The invention claimed is:

1. A golf ball comprising a solid core consisting of a center core and an outer core, wherein at least one of cores is made of a rubber composition comprising 100 parts by weight of a base rubber including 60 to 100% by weight of a polybutadiene containing at least 60% by weight of cis-1,4-bond, having a Mooney viscosity ($ML_{1+4}$ (100° C.)) of at least 52, and synthesized using a rare-earth catalyst, 10 to 60 parts by weight of an unsaturated carboxylic acid and/or a metal salt thereof, 5 to 80 parts by weight of an inorganic filler, and an organic peroxide, and wherein the center core has a JIS-C hardness of 40 to 60 on its center and a JIS-C hardness of 55 to 75 on its surface and the difference therebetween is at least 10, the outer core is harder than the surface hardness of the center core, the cross-sectional hardness of 1 mm outside from the border between the center core and the outer core is from 65 to 85 on a JIS-C hardness, the surface of the outer core has a JIS-C hardness of 75 to 95.

2. The golf ball of claim 1, wherein the polybutadiene has a polydispersity index Mw/Mn of 2.0 to 8.0 wherein Mw is a weight average molecular weight and Mn is a number average molecular weight.

3. The golf ball of claim 1, wherein the polybutadiene is a modified polybutadiene rubber which has been synthesized using a neodymium catalyst and subsequently reacted with an end group modifier.

4. The golf ball of claim 1, wherein said base rubber contains, in addition to said polybutadiene, a second polybutadiene synthesized using a Group VIII catalyst in an amount of up to 40% by weight, said second polybutadiene having a Mooney viscosity ($ML_{1+4}$ (100° C.)) of less than 50.

5. The golf ball of claim 1, wherein an organosulfur compound is added by 0.1 to 5 parts by weight based on 100 parts by weight of the base rubber.

6. The golf ball of claim 1, wherein at least two organic peroxides are included in the rubber composition and one organic peroxide has the shortest half-life at 155° C. designated (a) and another organic peroxide has the longest half-life at 1550C designated (b), a ratio of half-lives ($b_t/a_t$) is from 7 to 16 wherein at is the half-life of (a) of at least 15 seconds and up to 120 seconds and bt is the half-life of (b) of at least 300 seconds and up to 600 seconds, and a total content of the organic peroxides is 0.1 to 0.8 part by weight per 100 parts by weight of the base rubber.

7. The golf ball of claim 1, wherein the organic peroxide includes 1,1-bis(t-butylperoxy)-3,3,5-trimethylcyclohexane and dicumyl peroxide.

8. The golf ball of claim 1, having a cover enclosing the core and the cover consists of an inner cover layer and an outer cover.

9. The golf ball of claim 8, wherein the inner cover layer has a Shore D hardness of 50 to 80, the outer cover layer has a Shore D hardness of 35 to 65, and the outer cover layer has a lower Shore D hardness than the inner cover layer.

10. The golf ball of claim 1, wherein the center core has a diameter of 15 to 36 mm and the outer core has a thickness of 1.5 to 10 mm, and the inner cover layer has a thickness of 0.5 to 3.0 mm and the outer cover layer has a thickness of 0.7 to 2.0 mm.

* * * * *